(12) United States Patent
Andersen et al.

(10) Patent No.: US 10,206,050 B2
(45) Date of Patent: Feb. 12, 2019

(54) AUDIO ASSIST SYSTEM FOR PAIRING BETWEEN A HEARING AID AND AUDIO SYSTEM

(71) Applicant: Oticon A/S, Smørum (DK)

(72) Inventors: Marinus Andersen, Jægerspris (DK); Martin Bergmann, Smørum (DK); Søren Bredahl Greiner, Roskilde (DK); Thorvaldur Oli Bodvarsson, København S. (DK); Lars Riemer, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 15/457,309

(22) Filed: Mar. 13, 2017

(65) Prior Publication Data

US 2017/0272874 A1    Sep. 21, 2017

(30) Foreign Application Priority Data

Mar. 15, 2016    (EP) ..................... 16160411

(51) Int. Cl.
| | | |
|---|---|---|
| H04R 25/00 | (2006.01) | |
| H04W 4/80 | (2018.01) | |
| H04L 29/06 | (2006.01) | |
| H04W 4/21 | (2018.01) | |

(52) U.S. Cl.
CPC .......... H04R 25/554 (2013.01); H04L 69/18 (2013.01); H04W 4/21 (2018.02); H04W 4/80 (2018.02); *H04R 2225/55* (2013.01)

(58) Field of Classification Search
CPC ... H04R 25/554; H04R 2225/55; H04W 4/21; H04W 4/80; H04L 69/18
See application file for complete search history.

(56) References Cited

FOREIGN PATENT DOCUMENTS

| | | |
|---|---|---|
| EP | 1 981 253 A1 | 10/2008 |
| EP | 2 597 865 A1 | 5/2013 |
| EP | 2 696 609 A2 | 2/2014 |
| EP | 2 712 022 A1 | 3/2014 |
| EP | 2 696 609 A3 | 6/2016 |

*Primary Examiner* — Tuan D Nguyen
(74) *Attorney, Agent, or Firm* — Birch, Stewart, Kolasch & Birch, LLP

(57) ABSTRACT

The invention relates to an audio assist system, comprising a hearing aid, an external handheld device and an audio system comprising a Bluetooth audio transmitter, wherein the hearing aid comprises a Bluetooth receiver. The hearing aid and the external handheld device are temporarily connected via a wireless data link, and both the audio system and the external handheld device each comprise an infrared receiver and/or transmitter for establishing an at least unidirectional IR link between the external handheld device and the audio system. The external handheld device is adapted to transmit an automatic Bluetooth pairing trigger signal to the hearing aid via the wireless data link, when the external handheld device receives and/or transmits an IR signal via the IR link from or to the audio system, respectively, and the hearing aid is configured to perform Bluetooth pairing with the Bluetooth audio transmitter in response to receiving the automatic Bluetooth pairing trigger signal from said external handheld device.

17 Claims, 5 Drawing Sheets

AUDIO ASSIST SYSTEM FOR PAIRING BETWEEN A HEARING AID AND AUDIO SYSTEM

FIELD

The invention relates to an audio assist system and to a method for establishing a Bluetooth pairing.

BACKGROUND

It is well known that hearing aids can be configured as Bluetooth connectivity devices for being connected with audio devices such as a TV set, an audio set or a telephone, thereby forming an audio assist system. This allows a user of such a hearing aid, to hear sounds provided by the audio device and processed by the hearing aid in a better sound quality, compared to sounds mechanically received by the hearing aid. Thus, hearing aids with a Bluetooth receiver that form a part of an audio assist system can help to further normalize the life of hearing aid users.

For establishing a Bluetooth connection between hearing aid and audio device, usually a Bluetooth pairing has to be carried out. The Bluetooth pairing between two Bluetooth devices allows an unambiguous bonding of one Bluetooth device to another.

Document EP 1 981 253 A1 describes a body worn communication device for communicating with a hearing aid, the communication device being adapted for receiving a multitude of audio signals and for transmitting at least one audio signal selected among the multitude of audio signals to the hearing aid.

It is the object of the present invention to provide an improved audio assist system that comprises a hearing aid.

SUMMARY

According to a first aspect, the invention relates to an audio assist system that comprises a hearing aid, an external handheld device and an audio system comprising a Bluetooth audio transmitter. The hearing aid of the audio assist system comprises a Bluetooth receiver, and the hearing aid and the external handheld device are at least temporarily connected via a wireless data link. Furthermore, both the audio system and the external handheld device each comprise an infrared (IR) receiver and/or transmitter for establishing an at least unidirectional IR link between the external handheld device and the audio system. In addition, the external handheld device is adapted to transmit an automatic Bluetooth pairing trigger signal to the hearing aid via the wireless data link, when the external handheld device receives and/or transmits an IR signal via the IR link from or to the audio system, respectively. In response to receiving the automatic Bluetooth pairing trigger signal from said external handheld device, the hearing aid is configured to perform Bluetooth pairing with the Bluetooth audio transmitter.

The audio assist system according to the first aspect advantageously allows a Bluetooth pairing between hearing aid and audio system that does require nearly no interaction between user and the audio assist system, except for operating the external handheld device. The external handheld device forms an intuitive user interface of the audio assist system making it simple to carry out a Bluetooth pairing for the hearing aid user. Furthermore, the audio assist system does not require an elaborate manual processing scheme, such as identifying a device to be paired in a device list.

By providing the user interface at the external handheld device, there is no need for a large user interface in the hearing aid, which allows an advantageously small hearing aid size.

The combined use of the wireless data link with the external handheld device and of the Bluetooth audio transmitter of the audio system further allows an unidirectional link between hearing aid and audio system and therefore reduces a risk for an interruption of this link, compared to a bidirectional link.

By using the external handheld device, a user of the audio assist system allocates the used hearing aid to the audio system operated by the external handheld device. This excludes the risk of accidentally connecting the hearing aid to a further audio system, as for example with a TV set in another room. There is also no initial pairing with the audio system, so that the Bluetooth pairing is only performed if the hearing aid user want the hearing aid to receive an audio signal by the audio system.

By using a wireless connection between hearing aid and audio system, the hearing aid user can advantageously carry out a Bluetooth pairing without the need to physically approach to the audio system.

Furthermore, by using an IR link between audio system and external handheld device, which requires a line of sight between both devices, it is ensured that the hearing aid user does not hear sounds provided by the audio assist system, which he or she can not allocate optically. Using IR signals also allows the audio assist system to be built invisible, i.e. without any blinking lights that can be perceived by the hearing aid user. A further advantage is that using IR light makes use of a cheap and reliable commodity technology.

A further advantage of the audio assist system according to the first aspect is that it can be easily provided for recent hearing aids that comprise a Bluetooth receiver. It is therefore also simple and cheap to produce for recent audio systems. Furthermore, there is a large variety of possible applications of the audio assist system, since it can be easily adapted to different kinds of audio systems.

Since the wireless data link and the IR link are just used for carrying out the pairing, these links can be provided with a rather low bandwidth without a noticeable loss of performance of the audio assist system, in particular without a perturbing increasing of the duration of such a Bluetooth pairing.

In the following, embodiments of the audio assist system according the first aspect of the invention will be described In an embodiment of a first alternative of the audio assist system, the external handheld device comprises an infrared sensitive detector and is configured to generate and transmit the automatic Bluetooth pairing trigger signal when the IR sensitive detector detects an IR signal having characteristics of an IR signal put out by the audio system. The IR signal of this embodiment therefore just needs to include a signal that is assigned to the audio system that provided the IR signal. In a variant, the IR signal is provided by the audio system by controlling a blinking of an IR light connected to the audio system. The external handheld device of this embodiment may comprise a handheld processor, which is connected to the IR sensitive detector and to a data interface forming a part of the wireless data link, and which triggers the Bluetooth pairing trigger signal when the respective IR signal is detected.

In an embodiment of a first alternative of the audio assist system, the external handheld device comprises an infrared sensitive detector and is configured to generate and transmit the automatic Bluetooth pairing trigger signal when the IR sensitive detector detects an IR signal transmitted by the audio system. The IR signal of this embodiment therefore just needs to include a signal that is assigned to the audio system that provided the IR signal. In a variant, the IR signal is provided by the audio system by controlling a blinking of an IR light connected to the audio system. The external handheld device of this embodiment may comprise a handheld processor, which is connected to the IR sensitive detector and to a data interface forming a part of the wireless data link, and which triggers the Bluetooth pairing trigger signal when the respective IR signal is detected.

In a preferred variant of the previously mentioned embodiment, the infrared sensitive detector of the external handheld device is a camera. In particular, the external handheld device might be a smartphone or a notebook, which comprise the camera, respectively.

The audio assist system of this variant can comprise a smartphone with an appropriate audio assisting application (aka "APP"), using the smartphone camera for receiving the IR signal provided by the audio system. A typical bandwidth for a blinking scheme as provided by the IR signal is in the range between 10 and 50 bit/s. The camera of this variant has to provide an extended sensitivity range for the reception of light than the human eye, in order to receive the IR signal. The audio assisting system of this variant can therefore provide a Bluetooth pairing after pointing the camera at the IR light of the audio system the hearing aid user want to pair the hearing aid with. The audio assisting system of this embodiment therefore makes Bluetooth pairing particularly intuitive. Furthermore, just an appropriate audio assisting APP has to be developed, so that the audio assisting system of this variant just requires low development costs. By updating the audio assisting APP, the audio assisting system can be easily adapted to different external handheld devices or to different kinds of cameras. By using an electronic device, which the hearing aid user might already possess, there is no need for a further electronic device to use the audio assist system.

In an embodiment of a second alternative of the audio assist system, the external handheld device is a remote control that upon activation transmits an IR signal having characteristics that match the requirements of the audio system so as to start the audio system. Furthermore, the remote control of this embodiment upon activation transmits the automatic Bluetooth pairing trigger signal to the hearing aid via the wireless data link to thus initiate automatic Bluetooth pairing between the hearing aid and the audio system. The external handheld device of this embodiment can therefore be used as remote control of the audio system and as handheld device for controlling an establishing of the Bluetooth pairing between hearing aid and audio system. Therefore, the hearing aid user might not need a further electronic device to use the audio assist system.

In a further embodiment, the audio system comprises an audio device and a device adapter comprising an audio input connected to the audio device for receiving an audio stream from the audio device and the Bluetooth audio transmitter for broadcasting the audio stream to the hearing aid. The device adapter further comprises the infrared receiver for receiving an activation command and a unique key from the external handheld device. By using the device adapter in this embodiment, the audio device does not need to be adapted to the audio assist system. Furthermore, the device adapter and the external handheld device can easily be replaced in case of damage or malfunction, without replacing the whole audio assist system. In a variant of this embodiment, the device adapter is further configured to allow multiple users to activate a Bluetooth pairing and to receive a respective audio stream from the audio system. The device adapter is in a further variant adapted to process the audio stream according to hearing abilities of the user and to broadcast a respective processed audio stream to the hearing aid.

In an embodiment of the audio assist system, the device adapter further comprises a key processor that is configured to determine and provide an answer key, based on the received unique key, and wherein the device adapter is configured to transmit the answer key via the Bluetooth audio transmitter, and wherein the hearing aid is configured to receive the answer key and to perform Bluetooth pairing with the Bluetooth audio transmitter depending on the answer key. The audio assist system of this embodiment therefore requires an unidirectional IR link, an unidirectional wireless data link and an unidirectional broadcast via the Bluetooth audio transmitter. Compared to bidirectional links, such unidirectional links are more reliable since just one device has to provide a sufficient signal transmission range for upholding the respective link, while in the bidirectional case, the signal transmission ranges of both devices are important. In a variant of this embodiment, the hearing aid is configured to change a processing mode after receiving the Bluetooth pairing trigger signal at least for a predetermined period of time into an attendance mode, wherein the hearing device is prepared in the attendance mode for receiving a certain answer key. In a further variant, the determined answer key is identical to the unique key, received by the device adapter. In another variant, the answer key represents audience information, which is indicative of hearing aids that are allowed to perform a Bluetooth pairing with the audio system. After receiving the audience information, the hearing aid just performs Bluetooth pairing if it is one of the hearing aids that are allowed to perform Bluetooth pairing. In a further variant, the answer key represents an audio system information, which is indicative of the audio system that provided the answer key. Thus, in this variant the hearing aid can allow to perform a Bluetooth pairing depending on the respective audio system, which might be desirable in the context of child protection.

In a preferred variant of the previous embodiment, the external handheld device is configured to transmit the unique key to the hearing aid via the wireless data link, and the hearing aid is configured to perform Bluetooth pairing depending on a comparison between the unique key and the answer key. The audio assist device of this variant is thus configured to ensure that just the users who received the unique key are enabled to perform Bluetooth pairing upon a reception of an appropriate answer key. In a further preferred variant, the hearing aid comprises a memory unit that is configured to save the unique key received via the wireless data link. The saved unique key in this embodiment is later used for being compared to the answer key provided by the device adapter. In a further variant, the handheld device generates a new unique key periodically after predetermined periods of time. The hearing aid is than configured, upon receiving that new unique key, to compare the new answer key generated by the device adapter with the new unique key. Thereby it is ensured that the Bluetooth pairing is only performed, if the answer key has been triggered by the new generated unique key.

In a further variant of the previous embodiment the key processor is configured to provide the answer key after respective predefined time intervals, and wherein the answer key further depends on a time span between a reception of the unique key and the provision of the answer key. The answer key of this variant might become invalid after a short period of time, meaning that the Bluetooth pairing will not be performed by the hearing aid after receiving an invalid answer key. In a further example according to this variant, the unique key also depends on time and the answer key is valid as long as it is identical to the unique key, which is transmitted to the hearing aid via the wireless data link.

In an embodiment, the wireless data link is a short range connection, in particular a near field magnetic connection. The audio assist system of this embodiment ensures that the only receiver of the Bluetooth pairing trigger signal is the hearing aid user that recently uses the external handheld device, or at most someone sitting right next to him, so that no other hearing aids in the surrounding will be affected by this respective hearing aid trigger signal. Thus, each user can activate an audio signal provided by the audio system via the Bluetooth connection independently, by performing the Bluetooth pairing. A further second hearing aid user sitting next to the first hearing aid user whose hearing aid is connected to the audio device, can perform the Bluetooth pairing with another audio device without being affected by the first hearing aid user. In a further embodiment, the wireless data link is a Bluetooth link, in particular a BLE link.

In a preferred embodiment of the audio assist system the audio device is a TV set and the device adapter is a TV adapter. In another embodiment, the audio device is an audio set and the device adapter is an audio adapter. In principle, all devices that are configured to provide an acoustic tone can be used as audio device within the audio assist system, such as a telephone, a notebook, or a radio receiver.

In a further embodiment, the external handheld device is adapted to constantly transmit the IR signal via the IR link within a predetermined period of time. The predetermined period of time is preferably within a time range of between 1 and 3 seconds, 2 and 5 seconds or 3 and 8 seconds. In this variant, the IR signal is advantageously repeated, so that the audio system can reliably respond to a change of the IR signal after a predetermined period of time. Furthermore, if the IR signal is not received properly by the audio system, the user does not have to interact with the external handheld device again, in view of the frequently repeated IR signal.

In a further embodiment, the audio assist system is further configured such that if the hearing aid is Bluetooth paired with said external handheld device, the hearing aid is configured to disable the Bluetooth pairing with the audio system in response to receiving an automatic Bluetooth pairing trigger signal, in particular a further automatic Bluetooth pairing trigger signal from said handheld device. According to this embodiment, the hearing aid user can not only activate the Bluetooth pairing without going to the audio system but also deactivate the Bluetooth pairing intuitively with the external handheld device. In a variant, the unique key is provided by the handheld device by activating the audio system via the IR link, e.g. by pushing on or holding an "ON" button of the external handheld device. Analogously, a disabling of the Bluetooth pairing might be triggered by means of the handheld device by deactivating the audio system via the IR link, e.g. by pushing on or holding an "OFF" button of the external handheld device.

In a variant of the previous embodiment, the predetermined period of time is within a time range of between 1 and 3 seconds, 2 and 5 seconds or 3 and 8 seconds.

According to a second aspect, the invention relates to a method for establishing a Bluetooth pairing between a hearing aid that comprises a Bluetooth receiver and an audio system that comprises a Bluetooth audio transmitter via an external handheld device. The method comprises the steps of connecting the hearing aid at least temporarily with the external handheld device via a wireless data link;

establishing an at least unidirectional IR link between the external handheld device and the audio system;

receiving and/or transmitting an IR signal via the IR link from or to the audio system;

transmitting an automatic Bluetooth pairing signal to the hearing aid via the wireless data link; and performing the Bluetooth pairing with the Bluetooth audio transmitter in response to a reception of the automatic Bluetooth pairing trigger signal from said external handheld device.

The method advantageously avoids the need of user interaction for performing a Bluetooth pairing between hearing aid and audio system. Furthermore, the only user interaction required is formed by a using of the external handheld device, e.g. by simply controlling the audio system without any particular pairing command. Such method according to the present invention is therefore rather intuitive, quick and easy to implement, compared to usual pairing schemes.

In an embodiment of a first alternative of the method, the automatic Bluetooth pairing signal is generated and transmitted by the external handheld device in response to a detection of an IR signal having characteristics of an IR signal put out by the audio system.

In an embodiment of a second alternative of the method, the method further comprises the steps of transmitting a unique key to the audio system via the IR link and to the hearing aid via the wireless data link and thus initiating an automatic Bluetooth pairing between the hearing aid and the audio system;

generating an answer key based on the unique key by the audio system;

transmitting of the answer key by the Bluetooth audio transmitter; and reception of the answer key by the Bluetooth receiver and performing of the initiated automatic Bluetooth pairing depending on a comparison between the unique key and the answer key.

The first and second alternatives show two different communication schemes for performing a Bluetooth pairing according to the second aspect of the invention.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
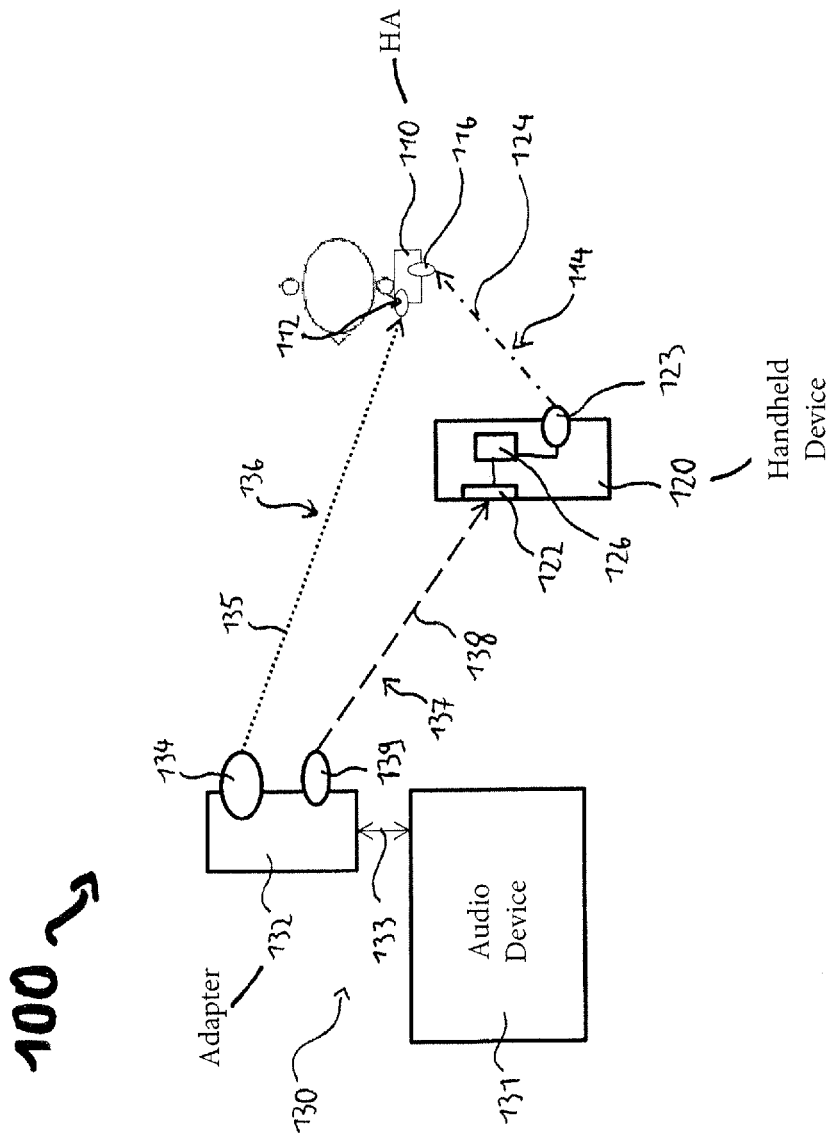
FIG. 1 illustrates a first embodiment of the audio assist system according to a first aspect of the invention.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid is adapted to be worn in any known way. This may include i) arranging a unit of the hearing aid behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing aid attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

Now referring to FIG. 1, which illustrates a first embodiment of the audio assist system 100 according to a first aspect of the invention.

The audio assist system 100 comprises a hearing aid 110, an external handheld device 120 and an audio system 130 comprising a Bluetooth audio transmitter 134.

The hearing aid 110 of this embodiment is a behind-the-ear (BTE) hearing aid that comprises a Bluetooth receiver 112 and is connected to the external handheld device 120 at least temporarily via a wireless data link 114, comprising a respective data reception interface 116. The wireless data link 114 is provided in this embodiment as near field magnetic link. The hearing aid 110 is configured to perform Bluetooth pairing with a Bluetooth audio transmitter 134 of a device adapter 132 of the audio system 130 in response to receiving an automatic Bluetooth pairing trigger signal 124 from the external handheld device 120 via the wireless data link 114.

In another example, the hearing aid may be any hearing aid, such as deep-in-the-ear hearing aid, cochlear hearing aid etc.

The external handheld device 120 in this embodiment is a smartphone comprising a camera 122, an external data interface 123 that forms a part of the wireless data link 114, and a handheld processor 126. The handheld processor 126 is connected to the camera 122 and to the external data interface 123 and is configured to generate and transmit the automatic Bluetooth pairing trigger signal 124 when the camera 122 detects an IR signal 138 having characteristics of an IR signal 138 put out by the audio system 130. This is achieved by a respective audio assist APP which is configured to trigger a determination of an IR signal 138 upon a respective user input on a user input interface formed by a display of the smartphone. The camera 122 thus forms an IR sensitive detector for establishing an at least unidirectional IR link 137 between the external handheld device 120 and the audio system 130.

In another example, the external handheld device may be a smart watch.

The audio system 130 comprises an audio device 131 and a device adapter 132, wherein the audio device 131 is a TV set and the device adapter 132 is a TV adapter. The audio device 131 is configured to transmit to the device adapter 132 an audio signal 133 that represents an acoustic tone to be provided by the TV set. The device adapter 132 comprises the Bluetooth audio transmitter 134, which is configured to provide an audio stream 135 representing the audio signal 133 via a Bluetooth connection 136. Furthermore, the audio system 130 comprises an IR interface 139 comprising an LED, which is configured to provide an IR signal 138 that represents audio system information, such as an audio system ID. The IR signal 138 is provided by a respective blinking of the LED.

For establishing a Bluetooth connection 136 between hearing aid 110 and audio system 130, the hearing aid user would have to provide a respective user input to the external handheld device 120. Than, the camera 122 of the handheld device 120 would start to detect the IR signal 138, which is steadily provided by the audio system 130, and to determine if the detected IR signal 138 has characteristics of an IR signal 138 put out by the audio system 130. If this is the case, the audio system information represented by the IR signal 138 is provided to the hearing aid 110 by transmitting the Bluetooth pairing trigger signal 124 via the wireless data link 114. In response to receiving the audio system information, the hearing aid 110 performs a Bluetooth pairing with the Bluetooth audio transmitter 134 of the device adapter 132.

After the Bluetooth pairing is performed, the audio stream 135 is received by the hearing aid 110 enabling the hearing aid user to perceive an acoustic output that represents the acoustic tone to be provided by the TV set.

Figure 2:
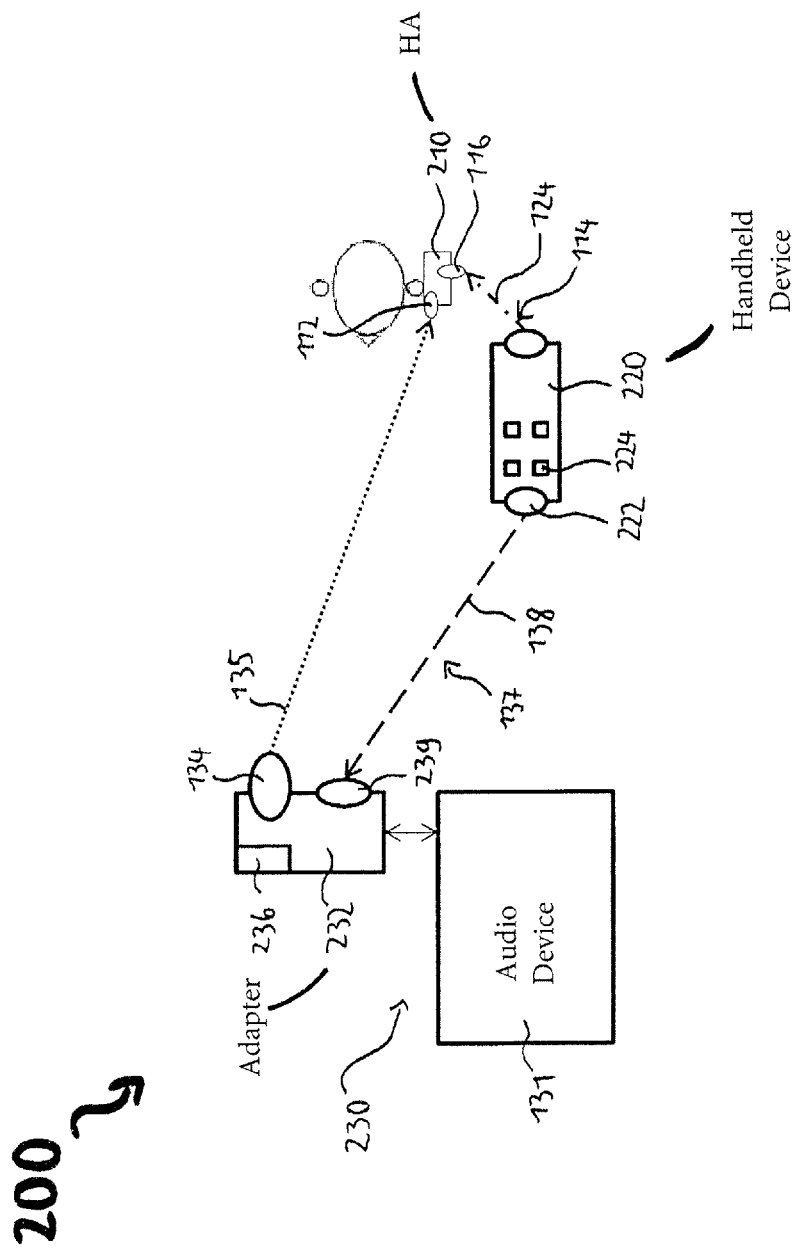
FIG. 2 illustrates a second embodiment of the audio assist system according to the first aspect of the invention.

FIG. 2 illustrates a second embodiment of the audio assist system 200 according to the first aspect of the invention.

The audio assist system 200 of the illustrated embodiment comprises the hearing aid 210, the external handheld device 220 and the audio system 230, which comprises the audio device 131, formed by a TV set, and the device adapter 232, formed by a TV adapter.

The external handheld device 220 of this embodiment is a remote control that comprises an IR transmitter 222 for establishing the IR link 137 with the audio system 230 and that is configured to transmit an IR signal 138 having characteristics that match the requirements of the audio system 230 so as to start the audio system 230. This transmission is triggered by pressing a button 224 of the external handheld device 220. In combination to the activation command, the IR signal 138 comprises a unique key that is thus transmitted to the audio system 230 via the IR link 137. The external handheld device 220 further provides the wireless data link 114 to the hearing aid 210 and is configured to further transmit the automatic Bluetooth pairing trigger signal 124 to the hearing aid 210 via the wireless data link 114, in response to a pressing of the button 224. Thereby the handheld device 220 initiates the automatic Bluetooth pairing between the hearing aid 210 and the audio system 230. The wireless data link 114 of this embodiment is a near field magnetic link that ensures proximity between external handheld device 220 and hearing aid 210, which allows the hearing aid user to perform a Bluetooth pairing for the own hearing aid independently from other hearing aid users.

The device adapter 232 comprises an IR receiver 239 for receiving the IR signal 138 with the activation command and the unique key. In response to the activation command, the audio system 230 is activated and a respective audio stream 135 representing the acoustic tone to be provided by the TV set is provided by the Bluetooth audio transmitter 134 of the device adapter 232. Different from FIG. 2, the audio stream 135 is not received by the hearing aid 210 as long as the Bluetooth pairing is not performed. An audio input from the TV set to the device adapter 232 is provided via HDMI, TOSLINK, or RCA. Furthermore, in response to the reception of the unique key, a key processor 236 of the device adapter 232 is configured to determine and provide an answer key, based on the received unique key. Afterwards the answer key is provided via the Bluetooth audio transmitter 134 together with the audio stream 135.

The hearing aid 210 is configured to receive the automatic Bluetooth pairing trigger signal 124 via the data reception interface 116. After receiving the Bluetooth pairing trigger signal 124, the hearing aid 210 switches into an attendance mode in which the hearing aid 210 is configured to receive the answer key, provided by the device adapter 232. In this embodiment, the hearing aid 210 is configured to switch into the attendance mode for a maximal period of time of about 3 to 30 seconds, preferable 5 to 15 seconds. After this period of time, the hearing aid 210 switches back into a resting mode and can therefore not perform Bluetooth pairing. In case that the hearing aid 210 receives the answer key via the Bluetooth receiver 112 while it is in the attendance mode, the Bluetooth pairing between hearing aid 210 and audio system 230 is performed.

In an embodiment not shown, the Bluetooth pairing depends on a comparison between the unique key and the answer key. In this embodiment, the automatic Bluetooth pairing trigger signal comprises the unique key and the hearing aid further comprises a device memory, which is configured to save the unique key. The answer key in this embodiment is identical to the unique key, so that the hearing aid compares if the saved unique key and the received answer key are identical, in order to perform the Bluetooth pairing. In a variant of this embodiment, the unique key generated by the handheld device changes periodically after a short period of time. Thereby it is ensured that the hearing aid only performs a Bluetooth pairing, if the answer key corresponds to the new generated unique key.

In a further embodiment not shown, the key processor is further configured to provide the answer key after respective predefined time intervals, and the answer key further depends on a time span between a reception of the unique key by the device adapter and the provision of the answer key.

Figure 3A:
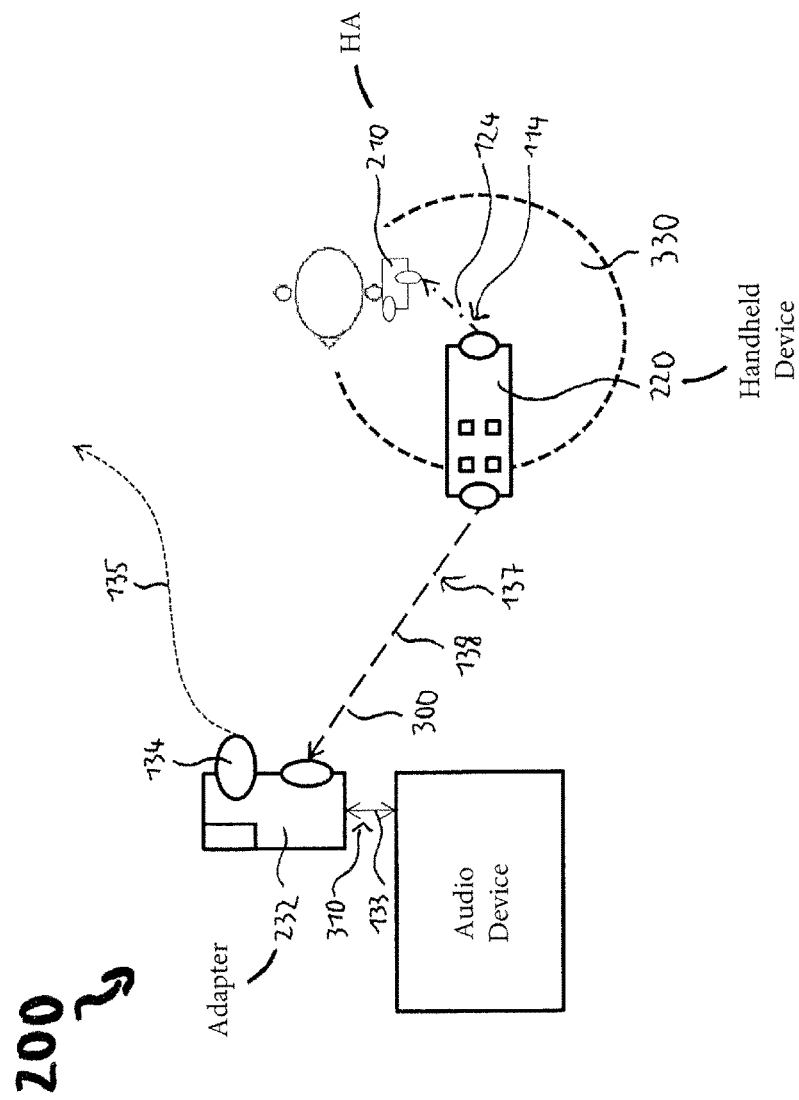
FIGS. 3a,b illustrate signal paths for providing a unique key (FIG. 3a) and for providing the answer key (FIG. 3b) for the second embodiment of the audio assist system according to the first aspect of the invention.
Figure 3B:
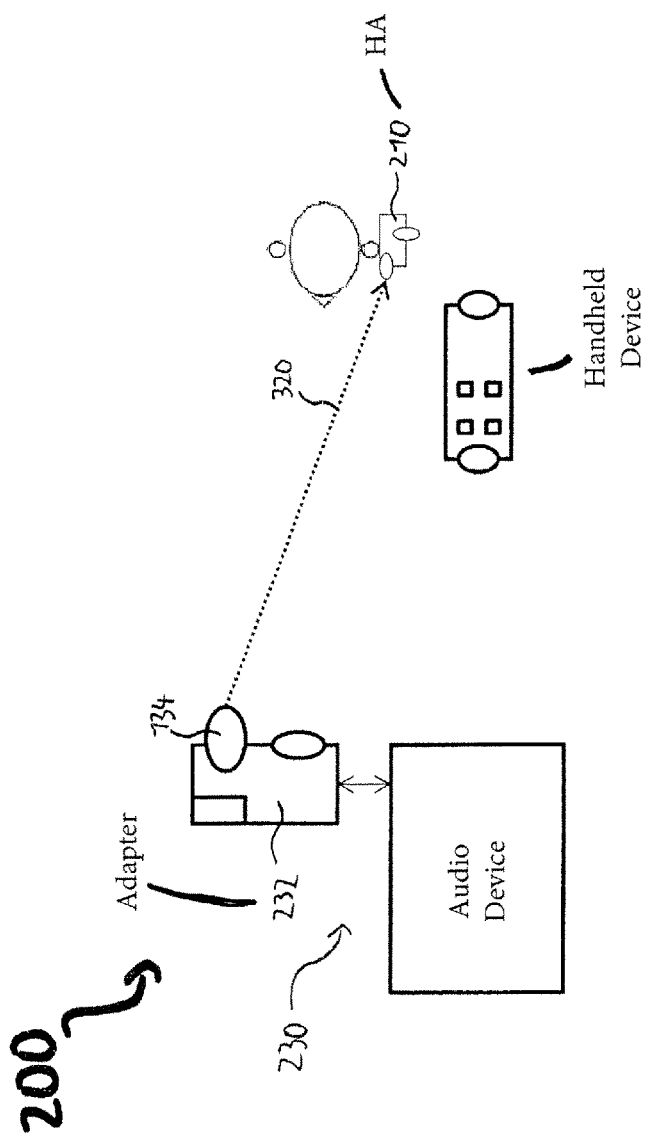

FIGS. 3a and 3b illustrate signal paths for providing a unique key 300 (FIG. 3a) and for providing the answer key 320 (FIG. 3b) for the second embodiment of the audio assist system 200.

The device adapter 232 receives the audio signal 133 from the TV set via the HDMI, TOSLINK, or RCA connection 310. The device adapter further transmits the audio stream 135 via the Bluetooth audio transmitter 134. Since no Bluetooth pairing with the hearing aid 210 took place, the audio stream 135 is not received by the hearing aid 210.

The handheld device 220 is within a line of sight with the device adapter 232 and thus able to provide the IR signal 138 via the IR link 137 including the unique key 300 and to further provide the automatic Bluetooth pairing trigger signal 124 via the wireless data link 114 to the hearing aid 210. The wireless data link 114 is a near field magnetic link that only transmits signals within a short signal range 330.

FIG. 3b shows the signal paths after the reception of the unique key 300 by the device adapter 232 and the reception of the automatic Bluetooth pairing trigger signal 124 by the hearing aid 210.

Since the hearing aid 210 is in the attendance mode, as mentioned above, it is able to receive the answer key 320 provided by the device adapter 232 via the Bluetooth audio transmitter 134. The answer key 320 in this embodiment is predefined and the hearing aid 210 compares the answer key with a number of saved predefined answer keys in order to register the answer key 320 as instruction to perform the Bluetooth pairing with the audio system 230.

In an embodiment not shown, the automatic Bluetooth pairing trigger signal comprises the unique key and the hearing aid is configured to save the unique key and to perform Bluetooth pairing depending on a comparison between the unique key and the answer key.

In a further embodiment not shown, the hearing aid is configured to disable the Bluetooth pairing with the audio system in response to receiving a further automatic Bluetooth pairing trigger signal from said handheld device. The audio assist system of this embodiment allows each hearing aid user in a surrounding of the audio system to activate or deactivate the audio stream provided by the device adapter independently. The respective Bluetooth pairings are independent from each other even if the hearing aid users use the same external handheld device, due to the wireless short range connection that is formed by the near field magnetic link.

Figure 4:
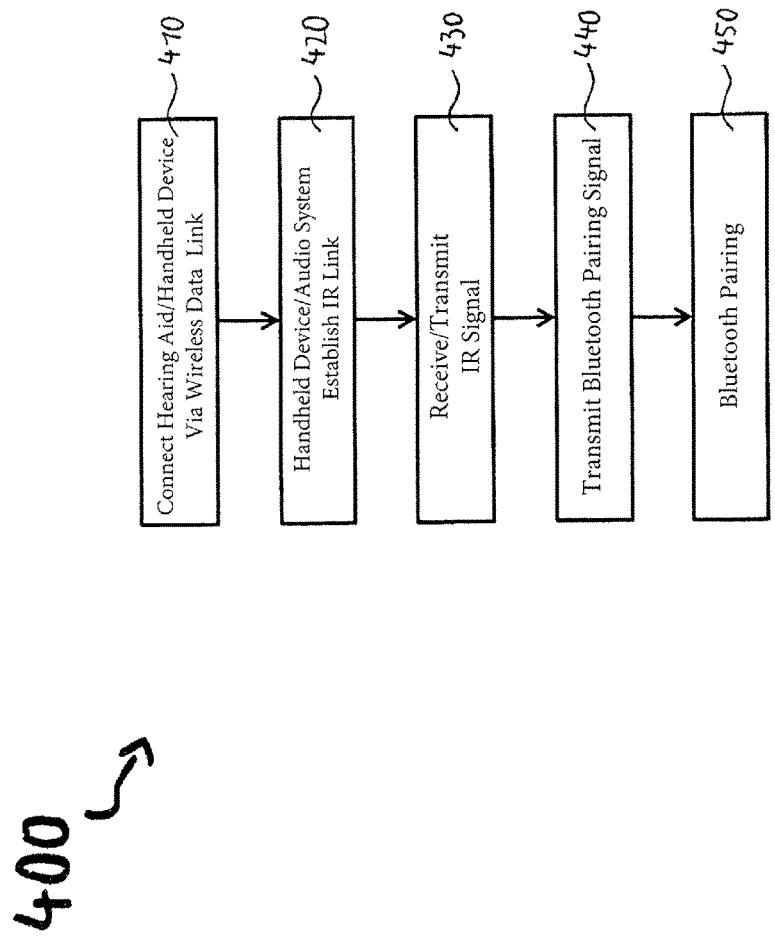
FIG. 4 illustrates an embodiment of the method for establishing a Bluetooth pairing between a hearing aid and an audio system according to a second aspect of the invention.

FIG. 4 illustrates an embodiment of the method 400 for establishing a Bluetooth pairing between a hearing aid and an audio system via an external handheld device according to a second aspect of the invention. The hearing aid comprises a Bluetooth receiver and the audio system comprises a Bluetooth audio transmitter. The method comprises the following steps.

In a first step 410, the hearing aid is at least temporarily connected with the external handheld device via a wireless data link.

A subsequent step 420 comprises the establishing of an at least unidirectional IR link between the external handheld device and the audio system.

A further step 430 forms a receiving and/or a transmitting of an IR signal via the IR link from or to the audio system.

Afterwards, a transmitting of an automatic Bluetooth pairing signal to the hearing aid via the wireless data link forms another step 440 of the method.

In a last step 450 the Bluetooth pairing with the Bluetooth audio transmitter is performed in response to a reception of the automatic Bluetooth pairing trigger signal from the external handheld device.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCE NUMBER LIST 100, 200 audio assist system
110, 210 hearing aid
112 Bluetooth receiver
114 wireless data link
116 data reception interface
120, 220 external handheld device
122 camera
123 external data interface
124 Bluetooth pairing trigger signal
126 handheld processor
130, 230 audio system
131 audio device
132, 232 device adapter
133 audio signal
134 Bluetooth audio transmitter
135 audio stream
136 Bluetooth connection
137 IR link
138 IR signal
139 IR interface
222 IR transmitter
224 button
236 key processor
239 IR receiver
300 unique key
310 HDMI, TOSLINK, or RCA connection
320 answer key
330 signal range
400 method
410 first step of the method
420 subsequent step of the method
430 further step of the method
440 another step of the method
450 last step of the method

The invention claimed is:

1. An audio assist system comprising
a hearing aid,
an external handheld device and
an audio system comprising a Bluetooth audio transmitter,
wherein the hearing aid comprises a Bluetooth receiver,
wherein the hearing aid and the external handheld device are at least temporarily connected via a wireless data link,
wherein both the audio system and the external handheld device each comprise an infrared receiver and/or transmitter for establishing an at least unidirectional infrared (IR) link between the external handheld device and the audio system,
wherein the external handheld device is adapted to transmit an automatic Bluetooth pairing trigger signal to the hearing aid via the wireless data link, when the external handheld device receives and/or transmits an IR signal via the IR link from or to the audio system, respectively,
wherein the hearing aid is configured to perform Bluetooth pairing with the Bluetooth audio transmitter in response to receiving the automatic Bluetooth pairing trigger signal from said external handheld device, and
wherein the external handheld device comprises an infrared sensitive detector and is configured to generate and transmit the automatic Bluetooth pairing trigger signal when the IR sensitive detector detects an IR signal having characteristics of an IR signal transmitted by the audio system.

2. Audio assist system according to claim 1, wherein the infrared sensitive detector of the external handheld device is a camera.

3. Audio assist system according to claim 2, wherein the audio system comprises an audio device and a device adapter comprising an audio input connected to the audio device for receiving an audio stream from the audio device and the Bluetooth audio transmitter for broadcasting the audio stream to the hearing aid, and
wherein the device adapter further comprises the infrared receiver for receiving an activation command and a unique key from the external handheld device.

4. Audio assist system according to claim 1, wherein the external handheld device is a remote control that upon activation
transmits an IR signal having characteristics that match requirements of the audio system so as to start the audio system and
transmits the automatic Bluetooth pairing trigger signal to the hearing aid via the wireless data link to thus initiate automatic Bluetooth pairing between the hearing aid and the audio system.

5. Audio assist system according to claim 4, wherein the audio system comprises an audio device and a device adapter comprising an audio input connected to the audio device for receiving an audio stream from the audio device and the Bluetooth audio transmitter for broadcasting the audio stream to the hearing aid, and
wherein the device adapter further comprises the infrared receiver for receiving an activation command and a unique key from the external handheld device.

6. Audio assist system according to claim 1, wherein the audio system comprises an audio device and a device adapter comprising an audio input connected to the audio device for receiving an audio stream from the audio device and the Bluetooth audio transmitter for broadcasting the audio stream to the hearing aid, and
wherein the device adapter further comprises the infrared receiver for receiving an activation command and a unique key from the external handheld device.

7. Audio assist system according to claim 6, wherein the device adapter further comprises a key processor that is configured to determine and provide an answer key, based on the received unique key, and wherein the device adapter is configured to transmit the answer key via the Bluetooth audio transmitter, and wherein the hearing aid is configured to receive the answer key and to perform Bluetooth pairing with the Bluetooth audio transmitter depending on the answer key.

8. Audio assist system according to claim 7, wherein the external handheld device is configured to transmit the unique key to the hearing aid via the wireless data link, and wherein the hearing aid is configured to perform Bluetooth pairing depending on a comparison between the unique key and the answer key.

9. Audio assist system according to claim 8, wherein the key processor is further configured to provide the answer key after respective predefined time intervals, and wherein the answer key further depends on a time span between a reception of the unique key and the provision of the answer key.

10. Audio assist system according to claim 7, wherein the key processor is further configured to provide the answer key after respective predefined time intervals, and wherein the answer key further depends on a time span between a reception of the unique key and the provision of the answer key.

11. Audio assist system according to claim 1, wherein the wireless data link is a short range connection, in particular a near field magnetic connection.

12. Audio assist system according to claim 1, wherein the audio device is a TV set and the device adapter is a TV adapter.

13. Audio assist system according to claim 1, wherein the external handheld device is adapted to constantly transmit the IR signal via the IR link within a predetermined period of time, wherein the predetermined period of time is within a time range of between 1 and 3 seconds, 2 and 5 seconds or 3 and 8 seconds.

14. Audio assist system according to claim 1, wherein the audio assist system is configured such that if the hearing aid is Bluetooth paired with said external handheld device, the hearing aid is configured to disable the Bluetooth pairing with the audio system in response to receiving an automatic Bluetooth pairing trigger signal from said external handheld device.

15. Method for establishing a Bluetooth pairing between a hearing aid that comprises a Bluetooth receiver and an audio system that comprises a Bluetooth audio transmitter via an external handheld device, wherein the method comprises the steps of
connecting the hearing aid at least temporarily with the external handheld device via a wireless data link;
establishing an at least unidirectional infrared (IR) link between the external handheld device and the audio system;
receiving and/or transmitting an IR signal via the IR link from or to the audio system;
transmitting an automatic Bluetooth pairing signal to the hearing aid via the wireless data link; and
performing the Bluetooth pairing with the Bluetooth audio transmitter in response to a reception of the automatic Bluetooth pairing trigger signal from said external handheld device,
wherein the automatic Bluetooth pairing signal is generated and transmitted by the external handheld device in response to a detection of an IR signal having characteristics of an IR signal transmitted by the audio system.

16. Method according to claim 15, further comprising
transmitting a unique key to the audio system via the IR link and to the hearing aid via the wireless data link and thus initiating an automatic Bluetooth pairing between the hearing aid and the audio system;
generating an answer key based on the unique key by the audio system;
transmitting of the answer key by the Bluetooth audio transmitter; and
reception of the answer key by the Bluetooth receiver and performing of the initiated automatic Bluetooth pairing depending on a comparison between the unique key and the answer key.

17. Method according to claim 15, wherein the wireless data link is a short range connection, in particular a near field magnetic connection.

* * * * *